US005453206A

United States Patent [19]
Browne

[11] Patent Number: 5,453,206
[45] Date of Patent: Sep. 26, 1995

[54] PROCESS FOR REMOVING SILICA FROM AQUEOUS LIQUORS

[75] Inventor: Geoffrey R. Browne, Boya, Australia

[73] Assignee: Modern Environmental Service Trust, Gidgegannup, Australia

[21] Appl. No.: 142,457

[22] PCT Filed: May 27, 1992

[86] PCT No.: PCT/AU92/00241

§ 371 Date: Jun. 22, 1994

§ 102(e) Date: Jun. 22, 1994

[87] PCT Pub. No.: WO92/21618

PCT Pub. Date: Dec. 10, 1992

[30] Foreign Application Priority Data

May 27, 1991 [AU] Australia ................. PK6312

[51] Int. Cl.$^6$ ........................................ C02F 1/56
[52] U.S. Cl. .................. 210/711; 210/714; 210/725; 210/727
[58] Field of Search .................... 210/665–667, 210/702, 710, 711, 714, 724, 725, 727, 728, 738

[56] References Cited

U.S. PATENT DOCUMENTS

| 3,142,638 | 7/1964 | Blaisdell | 210/714 |
| 3,377,274 | 4/1968 | Burke et al. | 210/727 |
| 3,388,060 | 6/1968 | Clark | 210/714 |
| 4,279,756 | 7/1981 | Weiss et al. | 210/667 |
| 4,783,265 | 11/1988 | Timmons | 210/666 |
| 4,882,064 | 11/1989 | Dixon et al. | 210/667 |
| 4,997,573 | 3/1991 | Browne | 210/714 |

FOREIGN PATENT DOCUMENTS

WO91/02698  3/1991  WIPO ................. 210/714

*Primary Examiner*—Peter A. Hruskoci
*Attorney, Agent, or Firm*—Michael, Best & Friedrich

[57] ABSTRACT

A process for removing silica in dissolved or colloidal form from an aqueous liquor comprising, precipitating/adsorbing the silica with or onto a precipitant/adsorbent, typically a compound containing aluminium, magnesium, or iron, forming floccs of the precipitated/adsorbed silica, and separating the floccs from the liquor.

6 Claims, No Drawings

PROCESS FOR REMOVING SILICA FROM AQUEOUS LIQUORS

The present invention relates to a process for removing silica from aqueous liquors.

It is known that soluble and colloidal silica present in water that is used in cooling water circuits in gas or coal fired power stations or other applications is undesirable since it tends to form extremely hard deposits that progressively reduce the heat transfer efficiency of the cooling water circuits.

There are a number of known chemical and physical means for removing the silica deposits. However, all these known means have disadvantages. For example, one physical means comprises projecting a scraper bullet through the tubing in cooling water circuits to scrape away the deposits. The disadvantage of this technique is that there is an unacceptable risk of damage to the cooling water circuits.

An object of the present invention is to provide a process for removing soluble and colloidal silica from aqueous liquors to minimise the extent of the silica deposits.

According to the present invention there is provided a process for removing silica in dissolved and/or colloidal form from an aqueous liquor comprising:

(a) precipitating/adsorbing the dissolved and colloidal silica with/onto a precipitant/adsorbent;

(b) adding a flocculent to the liquor to form floccs of the precipitated/adsorbed silica and any other suspended solids in the liquor and the flocculent; and (c) separating the floccs from the liquor.

The term "precipitant/adsorbent" is understood herein to mean any element or compound in soluble or insoluble form that is capable by mechanisms of precipitation or adsorption of changing dissolved and/or colloidal silica into a state that can be separated more readily from the liquor.

It is preferred that step (a) comprises adjusting the pH of the liquor to promote precipitation/adsorption.

It is particularly preferred that step (a) comprises adjusting the pH to be equal to or greater than 8.0.

It is more particularly preferred that step (a) comprises adjusting the pH to be equal or greater than 8.5.

Typically, step (a) comprises adjusting the pH to be equal or greater than 9.0.

It is preferred that the process further comprises the step of adding an inert particulate carrier prior to or at the same time as the step (b) of adding the flocculent.

It is particularly preferred that the inert particulate carrier is added prior to the addition of the flocculent.

It is preferred that the process further comprises, after step (c), agitating the floccs to break up the floccs and separating the inert particulate carrier for recycling in the process.

It is preferred that the precipitant/adsorbent comprises a compound containing one or more of aluminium, magnesium, and iron. It is noted that in some situations the precipitant/adsorbent may already be in the liquor and the pH adjustment is required to promote precipitation/adsorption of the dissolved or colloidal silica with/onto the precipitant/adsorbent. It is also noted that in other situations it may be necessary to add the precipitant/adsorbent to the liquor, with or without pH adjustment.

It is particularly preferred that the precipitant/adsorbent is a soluble aluminium salt such as sodium aluminate, aluminium sulphate or aluminium chloride.

It is particularly preferred in situations where the precipitant/adsorbent is a soluble aluminium salt that the process comprises, after step (c), lowering the pH of the liquor to 7.5 or less to precipitate any soluble aluminium retained in the liquor.

The term "liquor" is understood herein to include aqueous and non-aqueous liquors.

The term "inert" as used herein in relation to "particulate carrier" is understood herein to mean that the particulate carrier is not substantially attacked by the liquor. In other words, the term "inert" means that the particulate carrier exhibits both suitable chemical and physical stability in the liquors.

It is preferred that the inert particulate carrier is selected from the group consisting of sand, alumina, garnet, magnetite, hematite, ilmenite, and calcite.

The term "suspended solids" is understood herein to include organic and inorganic material.

It is preferred that the flocculent is a polyelectrolyte flocculent.

The term "polyelectrolyte flocculent" as used herein is understood to mean any suitable cationic, non-ionic and anionic flocculent.

The process of the present invention is described further by reference to the following examples.

EXAMPLE 1

A series of experiments was carried out on water from the cooling water circuit of the Muja coal-fired power station in Collie, Western Australia. The water was at pH 8.0 and contained a total of 69 ppm silica in dissolved and colloidal form.

A number of samples of the water were tested to investigate the effect of the following parameters on the removal of silica from the water.

1. Precipitant/adsorbent, the following precipitants/adsorbents were tested:
   (a) soluble iron or aluminium containing compounds;
   (b) soluble aluminium containing compounds; and
   (c) a combination of soluble iron and aluminium containing compounds and lime.

2. pH.

3. Contact time of precipitant/adsorbent and water prior to addition of inert particulate carrier.

4. Inert particulate carrier (IPC).

The results of the experiments are set out in Table 1 below.

With reference to Table 1, the experiments T1 to T7 and T10 to T24 were carried out in accordance with the following sequence of steps.

1. Addition of precipitant/adsorbent to liquor.

2. Adjustment of pH.

3. Addition of inert particulate carrier and polyelectrolyte flocculent (Zetag 92 in a cationic flocculent produced by Allied Colloids) after prescribed contact time of precipitant/adsorbent and water.

4. Separation of floccs of precipitated/adsorbed silica, inert particulate carrier, polyelectrolyte flocculent and suspended solids in the liquor.

The experiments T8 and T9 were carried out without the addition of precipitant/adsorbent and in the case of the experiment T8 without adjustment of pH.

TABLE 1

| Test | Precipitant/Adsorbent (ppm) Fe+3 | Al+3 | CaO | pH | Batch Contact Time (hrs:mins) | IPC Used | Silica Assay (ppm) | Silica Removal (%) |
| --- | --- | --- | --- | --- | --- | --- | --- | --- |
| T1 | 77 | — | — | 10 | 0:45 | Magnetite | 4 | 94 |
| T2 | 77 | — | — | 9.5 | 0:45 | " | 22 | 68 |
| T3 | 77 | — | — | 9.2 | 0:17 | " | 24 | 65 |
| T4 | 20 | — | — | 10 | 0:45 | " | 30 | 56 |
| T5 | 77 | — | — | 8.0 | 0:45 | " | 18 | 74 |
| T6 | 20 | — | — | 8.5 | 2:0 | " | 41 | 41 |
| T6 | 20 | — | — | 8.0 | 14:0 | " | 44 | 36 |
| T7 | 77 | — | — | 9.5 | 0:01 | " | 22 | 68 |
| T8 | — | — | — | 8.0 | 0:00 | " | 53 | 23 |
| T9 | — | — | — | 9.5 | 0:10 | " | 59 | 14 |
| T10 | — | 92 | — | 9.5 | 0:15 | " | 1 | 99 |
| T13 | — | 45 | — | 9.5 | 0:15 | " | 8 | 88 |
| T14 | 77 | — | — | 9.5 | 0:45 | Silica | 18 | 74 |
| T15 | — | 92 | — | 9.3 | 0:15 | " | <1 | >99 |
| T16 | — | 92 | — | 9.3 | 0:40 | Magnetite | <1 | >99 |
| T17 | 100 | 60 | 0.2 | 9.6 | 1:10 | " | 29 | 66 |
| T18 | 100 | 60 | 0.2 | 9.6 | 1:10 | " | 6 | 93 |
| T19 | 50 | 30 | 0.1 | 8.9 | 1:10 | " | 4 | 95 |
| T20 | 50 | 30 | 0.1 | 8.7 | 1:10 | " | 27 | 68 |
| T21 | 50 | 30 | 0.25 | 9.0 | 2:10 | " | 5 | 94 |
| T22 | 25 | 15 | 0.2 | 9.1 | 2:10 | " | 16 | 81 |
| T23 | — | 25 | — | 9.6 | 0:15 | " | 9 | 89 |
| T24 | — | 25 | — | 9.6 | 0:15 | " | 18 | 79 |

The results for experiments T5 and T8 and for experiments T2 and T9 in Table 1 indicate clearly that the addition of a precipitant/adsorbent to the water at the feed level of pH 8.0 followed by the addition of inert particulate carrier and polyelectrolyte flocculent produced a significantly higher removal of silica from the water than the addition of inert particulate carrier and polyelectrolyte flocculent without the addition of precipitant/adsorbent.

It can also be seen from Table 1 that an increase of the pH of the water above the feed level of pH 8.0 following the addition of a precipitant/adsorbent and prior to the addition of inert particulate carrier and polyelectrolyte flocculent produced a further increase in the removal of silica from the water. In this regard, the results for experiments T1, T10, T15, T16, T18, T19 and T21 indicate that in excess of 90% of the silica in the water was removed by such a process.

In summary, it can be seen from Table 1 that generally there was an increase in the removal of silica:

(a) with an increase in the addition of precipitant/adsorbent at a given pH (cf the results of experiments T10/T13 and T1/T4); and (b) with an increase in the pH at a given concentration of precipitant/adsorbent (cf the results of experiments T4/T6).

EXAMPLE 2

A further series of experiments was carried out on water from the cooling water circuit of the Muja coal-fired power station.

The experiments focussed on the use of alumina as the precipitant/adsorbent and the inert particulate carrier. The following is a brief outline of the experimental procedure.

1. Addition of calcined or hydrated alumina to water.
2. Adjustment of pH to be higher than 9.0.
3. Agitation of water/alumina.
4. Addition of polyelectrolyte flocculent (Zetag 92).
5. Agitation of water/alumina/flocculent.
6. Separation of floccs of precipitated/adsorbed silica, alumina, and polyelectrolyte flocculent.

The results of the experiments are set out in Table 2 below.

TABLE 2

| Test | Alumina (ppm) | Comments | Silica (ppm) | Silica Removal (%) |
| --- | --- | --- | --- | --- |
| 1 | 100 | pH increased to 9.2 and then +24 hr agitation | 0.1 | 99 |
| 2 | 100 | As for 1, but only 0.5 hr agitation after pH adjustment | 2.1 | 97 |
| 3 | 100 | Alumina washed at pH 11.5, decanted water then added alumina to water - resultant pH 10.2, 0.5 hr agitation following addition of alumina | 2.7 | 96 |
| 4 | 100 | Alumina washed at pH 11.5 and then filtered and added to water - resultant pH 9.3, 0.5 hr agitation following addition of alumina | 2.1 | 97 |

The results in Table 2 indicate that the addition of a precipitant/adsorbent, followed by adjustment of pH to be higher than 9.0, and subsequent addition of a polyelectrolyte flocculent substantially removed the silica from the water.

EXAMPLE 3

A further series of experiments was carried out on water from the cooling water circuit of the Muja coal-fired power station. The water contained a total of 50 ppm silica in dissolved and colloidal form.

The experiments focused on the effect of pH on the removal of silica from the water.

The experiments were carried out in accordance with the following sequence of steps.

1. Addition of 10 ppm or 20 ppm of a soluble aluminium containing compound as precipitant/adsorbent.
2. Adjustment of pH.
3. Addition of inert particulate carrier and polyelectrolyte flocculent.

The results of the experiments are set out in Table 3 below.

TABLE 3

| pH | Residual Silica (ppm) | |
|---|---|---|
| | 10 ppm precipitant/adsorbent | 20 ppm precipitant/adsorbent |
| 7 | 42 | 24 |
| 8 | 32 | 12 |
| 9 | 28 | 4 |
| 10 | 10 | 2 |

The results in Table 3 above indicate that at a given concentration of precipitant/adsorbent there was an increase in the removal of silica with an increase in the pH.

In particular, the results for the experiments based on the addition of 20 ppm precipitant/adsorbent indicate that there was a significant increase in silica removal at pH levels equal to and above 8.0.

EXAMPLE 4

A series of experiments was carried out on water from the cooling water circuit of a Queensland Nickel Pty. Ltd. plant at Gladstone, Queensland.

The make-up water to the cooling circuit contained 72 ppm dissolved and colloidal silica and the cooling tower water contained 278 ppm dissolved and colloidal silica.

The experiments focussed on the effect of the amount of the addition of precipitant/adsorbent on the removal of silica from the water.

The experiments were carried out in accordance with the following sequence of steps:

1. Addition of soluble aluminium containing compounds as precipitant/adsorbent.
2. Adjustment of pH to 9.6.
3. Addition of inert particulate carrier and polyelectrolyte flocculent.

The results of the experiments are set out in Table 4 below.

TABLE 4

| Precipitant/adsorbent Addition (ppm) | Residual Silica (ppm) | |
|---|---|---|
| | Make Up | Cooling Tower |
| 0 | 72 | 278 |

TABLE 4-continued

| Precipitant/adsorbent Addition (ppm) | Residual Silica (ppm) | |
|---|---|---|
| | Make Up | Cooling Tower |
| 10 | 64 | 210 |
| 20 | 22 | 214 |
| 40 | 8 | 78 |
| 80 | 18 | 8 |

The results in Table 4 above indicate that at a given pH there was an increase in the removal of silica with an increase in the addition of precipitant/adsorbent.

By way of summary, the experimental results presented in Examples 1 and 2 establish that it is possible with the process of the invention to substantially remove soluble and colloidal silica from water. This is a significant outcome in relation to the coal and gas fired power station industry in particular and for industry in general which relies on the use of cooling water circuits.

Many modifications may be made to the process of the present invention as described above without departing from the spirit and scope of the present invention.

I claim:

1. A process for removing silica in dissolved and/or colloidal form from an aqueous liquor comprising:

(a) precipitating/adsorbing the dissolved and colloidal silica with/onto a precipitant/adsorbent, the precipitant/adsorbent comprising a compound containing one or more of aluminium, magnesium, and iron, the step (a) comprising adjusting the pH to be equal to or greater than 8.0;

(b) adding a polyelectrolyte flocculent to the liquor to form floccs of the precipitated/adsorbed silica and any other suspended solids in the liquor and the flocculent;

(c) adding an inert particulate carrier prior to or at the same time as the step (b) of adding the flocculent, the inert particulate carrier being selected from the group consisting of sand, alumina, magnetite, hematite, ilmenite, and calcite, wherein said flocs include said inert perticulate carrier; and (d) separating the floccs from the liquor.

2. The process defined in claim 1, wherein step (a) comprises adjusting the pH to be equal or greater than 8.5.

3. The process defined in claim 2, wherein step (a) comprises adjusting the pH to be equal or greater than 9.0.

4. The process defined in claim 1, wherein the inert particulate carrier is added prior to the addition of the flocculent.

5. The process defined in claim 1, further comprising, after step (d), agitating the floccs to break up the floccs and separating the inert particulate carrier for recycling in the process.

6. The process defined in claim 1, wherein the precipitant/adsorbent is a soluble aluminium salt selected from the group consisting of sodium aluminate, aluminium sulphate or aluminium chloride.

* * * * *

UNITED STATES PATENT AND TRADEMARK OFFICE
CERTIFICATE OF CORRECTION

PATENT NO. : 5,453,206
DATED : Sep. 26, 1995
INVENTOR(S) : Geoffrey R. Browne

It is certified that error appears in the above-identified patent and that said Letters Patent is hereby corrected as shown below:

On the cover page, delete the following:
   Assignee: Modern Environmental Service Trust, Gidgegannup, Australia On the cover gage, ADD the following:
   Assignee: Dawn Annette Hoefer, trustee of Modern Environmental Service Trust, Gidgegannup, Australia Signed and Sealed this Twenty-sixth Day of March, 1996

Attest:

BRUCE LEHMAN

Attesting Officer     Commissioner of Patents and Trademarks